United States Patent [19]

Schmidt

[11] Patent Number: 4,848,782
[45] Date of Patent: Jul. 18, 1989

[54] TRANSPORT DEVICE FOR ATHLETIC EQUIPMENT

[76] Inventor: Peter Schmidt, Ziegeleiweg 20, D-5000 Koln 90, Fed. Rep. of Germany

[21] Appl. No.: 149,644

[22] Filed: Jan. 28, 1988

[30] Foreign Application Priority Data

Jan. 29, 1987 [DE]  Fed. Rep. of Germany ....... 3702649
Sep. 7, 1987 [DE]  Fed. Rep. of Germany ....... 3729944
Nov. 5, 1987 [DE]  Fed. Rep. of Germany ....... 3737587

[51] Int. Cl.⁴ ............................................. B62B 1/12
[52] U.S. Cl. ........................... 280/47.131; 190/18 A; 224/151; 224/191; 224/917; 280/7.14; 280/47.17; 280/47.18; 280/47.26; 280/814; 280/DIG. 6; 294/147
[58] Field of Search ...................... 280/47.13 R, 47.17, 280/47.18, 47.24, 47.26, 814, 815, DIG. 6, 7.12, 7.14; 294/147; 190/18 A; 224/917, 151, 191

[56] References Cited

U.S. PATENT DOCUMENTS

| | | | |
|---|---|---|---|
| 3,889,861 | 6/1975 | Fihn | 280/814 |
| 3,917,137 | 11/1975 | Wilkins | 294/147 |
| 3,985,373 | 10/1976 | Widegren | 280/652 |
| 4,071,176 | 1/1978 | Tuzee | 224/917 |
| 4,152,002 | 5/1979 | Olson | 280/814 |
| 4,358,137 | 11/1982 | Gramm | 280/814 |

FOREIGN PATENT DOCUMENTS

| | | | |
|---|---|---|---|
| 645226 | 7/1962 | Canada | 280/47.24 |
| 2528968 | 1/1976 | Fed. Rep. of Germany . | |
| 3439278 | 8/1985 | Fed. Rep. of Germany . | |
| 1522202 | 4/1902 | France | 280/814 |
| 760006 | 2/1934 | France | 190/18 A |
| 231171 | 7/1944 | Switzerland | 280/47.26 |

Primary Examiner—Charles A. Marmor
Assistant Examiner—Eric Culbreth
Attorney, Agent, or Firm—Ostrolenk, Faber, Gerb & Soffen

[57] ABSTRACT

A transport device for athletic equipment includes a transport container movable over the ground, e.g. on wheels through a telescoping push rod. The container has front and rear surfaces inclined toward each other and joined by a rounded connect surface extending front to back. The container is also divided along its longitudinal central plane into two side-by-side half shells locked together. The half shells may be pivotally connected to each other to swing with respect to each other. A cover extends over the top of the container. A channel extends substantially parallel to an inclined surface to receive an end of elongated athletic articles which can extend out of the top of the container. The channel may be slightly conically tapered in shape. A spreading device at the top of the channel may separate the elongate articles being held there. A device along the handle may hold the upstanding ends of the elongate articles in the container. The cover also may have openings through it for passage of athletic articles.

12 Claims, 7 Drawing Sheets

TRANSPORT DEVICE FOR ATHLETIC EQUIPMENT

BACKGROUND OF THE INVENTION

The present invention refers to a transport device for athletic equipment of the type having a transport container which is movable over the ground and which holds at least a portion of athletic equipment therein.

Upon engagement in various sports it is necessary to transport heavy and/or bulky articles of athletic equipment over long distances. In order to facilitate the transportation of this athletic equipment a large number of transport devices have been developed which are generally intended specially for one given type of sport.

Thus, for instance, for the transportation of skis there are known ski transport devices (Federal Republic of Germany OS No. 3 439 278) which consist of a supporting member into which the ends of the skis, placed flat against each other, can be clamped. The supporting member is provided on one side with slide skids and on the opposite side with rollers so that the ends of the skis can slide or roll on smooth ground.

A transport device for ski equipment is also known (U.S. Pat. No. 4,358,137) in which the transport container is formed by a chassis provided with two wheels, to which chassis there is fastened the lower end of a transport bag which can be rolled up and be closed by a slide fastener along one longitudinal side. Carrying loops are attached to the transport bag which make it possible for the user to pull or push the chassis. The chassis furthermore has an insertion opening for the lower ends of the skis into which the skis can be loosely inserted and be surrounded as a whole by the transport bag within which the ski boots and possibly also the ski poles can be arranged. The manufacture of this known transport device is relatively expensive and furthermore the moving of this known transport device over the surface of the ground is relatively difficult since the holding grips fastened to the transport bag do not have a rigid attachment to the chassis. Furthermore, movement of this transport device over soft snow is not possible since in such case the wheels sink in and prevent movement.

There is also known a transport device for golf equipment (Federal Republic of Germany OS No. 2 528 968) in which a pull or push rod is surrounded by ring-shaped holding elements for the golf clubs and which bears at its lower end removable wheels for the rolling of the transport device. Although this transport device is also collapsible after removal of the wheels and a part of the pull rod, it takes up a considerable amount of space, which is all the more troublesome since this transport device, in the same way as all the transport devices described above, is usable only for one specific sport and thus a number of them must be present alongside of each other if different sports are engaged in.

SUMMARY OF THE INVENTION

The object of the invention is to create a transport device of the aforementioned type which, while being of simple construction, permits convenient transportation of various types of athletic equipment such as, for instance, ski shoes, skis and ski poles as well as golf clubs, fishing rods and other articles of athletic equipment or camping and water sports equipment.

By the development of the transport device in accordance with the invention, there is obtained a convenient, universal device for the transportation of the most different types of athletic equipment and apparatus, in which, in the case of elongated articles of athletic equipment inserted into the holding channels they themselves can serve as pull or push rod or, if such elongated articles of athletic equipment are not present, then pull-rod sections arranged in the holding channels when not in use can be assembled together and connected to the transport container in order to form the pull rod.

Due to the bottom surfaces which are inclined to each other at an angle of 90° or less, it is possible to park the transport container on one bottom surface, the other bottom surface then extending substantially vertically, and articles of athletic equipment which are inserted into the holding channel adjacent this vertically standing bottom surface stand vertically without there being any danger of the transport container tipping over. This is true, in particular, when heavy articles of athletic equipment such as, for instance, ski shoes, are arranged in the transport container since in such case the center of gravity of the transport device including all the articles of athletic equipment is very low. Due to the shape of the bottom surfaces and the connecting surface which connects them together, it is possible to move the transport container both over solid ground and over soft ground, for instance snow, since the bottom side of the transport container which is formed by the connecting surface and/or the bottom surfaces forms a slide skid.

By the development of the transport container in the form of two identical half-shells which can be connected to each other by locking devices, there is possible a very simple manufacture from, for instance, plastic material, in which connection sealing elements may be provided along the edges of the two half-shells. In this way the articles of athletic equipment which are arranged in the transport container are reliably protected from the penetration of dirt and moisture. The transport container can furthermore be used as a carry trunk when the wheels are removed, so that very convenient handling results.

When using elongated articles of athletic equipment as push or pull rod for the transport container these articles of athletic equipment, in accordance with the preferred embodiment of the invention, are so inserted into the holding channels that they lie on the opposite sides of a spreading device which is arranged above the insertion opening at the upper end of the holding channels. This spreading device urges the two articles of athletic equipment, such as, for instance, skis, apart particularly for the reason that the holding channel is developed tapering slightly down towards its lower end. This movement of the free ends of the skis away from each other is counteracted by means of a holding grip which is fastened on the free end of the skis which have been inserted in the transport container, at a place which is convenient for the user, it holding the skis together and facilitating the moving of the transport container and of the skis. By the holding or pulling together of the free ends of the skis, they are swung around the central part of the carrying handle so that the lower ends of the skis arranged in the holding channel are pressed against the wall of the holding channel and anchored firmly in it. The holding handle can serve simultaneously to fasten ski poles together with the skis.

This anchoring and holding of the skis in the spreading device can be further improved by the fact that the central part of the bar-shaped spreading device tapers down towards the center. In that way, the skis are centered and any laterally directed movement of the skis with respect to the central part of the spreading device is reliably avoided.

By the anchoring of the rear ends of the skis or other elongated articles of athletic equipment on the transport container pursuant to the present ivnention there is obtained a very firm and rigid attachment of these articles of athletic equipment to the transport container so that convenient handling of this transport container is made possible without separate pull or push means being required.

Should certain athletic equipment not include long elongated articles of athletic equipment it is furthermore possible to form a pull or push rod from two substantially identical pull rod sections which can be telescopically connected to each other via detent devices arranged on one end while on their other end they bear grips which have a non-circular hole passing through them the shape and dimensions of which are adapted to the cross-sectional shape of the spreading devices. After the opening of the half-shells the grip of a pull rod section can thus be pushed over the spreading device and upon the closing of the transport container be locked on this spreading device so that simple attachment of this pull rod to the transport container is obtained. When this push or pull rod is not used, the two connecting rod sections can be inserted into the holding channels and also held fast in these holding channels by pushing the grips over the spreading device.

If the athletic equipment used includes a large number of elongated bulky articles of athletic equipment such as, for instance, golf clubs or the like, for all of which there is not room in the holding channels then, in accordance with one advantageous embodiment of the invention, openings are provided in the cover surface of the transport container, into which openings replaceable holding devices for receiving these articles of athletic equipment and/or small parts can be inserted. These holding devices can, for instance, be formed, for instance in the case of golf clubs, by a golf bag, it being furthermore possible to insert a container for small parts in another one of such openings, said container being adapted to be closed by flaps.

Through these additional openings in the cover surface of the transport container there is thus obtained a further improvement in the universal use of the transport container. Upon the non-use of these openings they can, of course, be closed by flaps.

In accordance with a preferred embodiment of the invention these flaps can at the same time be locked by closure devices which are provided for the locking of the two half-shells of the transport container to each other.

BRIEF DESCRIPTION OF THE DRAWING

The invention will be explained in further detail below with reference to embodiments shown in the drawing, in which:

FIG. 8 is a sectional view corresponding to FIG. 2 of the transport container with inserted golf bag and the like.

DETAILED DESCRIPTION OF THE DRAWINGS

FIGS. 1 to 5 show an embodiment of the transport device for its use upon the transportation of ski equipment. It is readily noted that the reference to skis could be replaced in the same way by reference to other long articles of athletic equipment.

Figure 1:
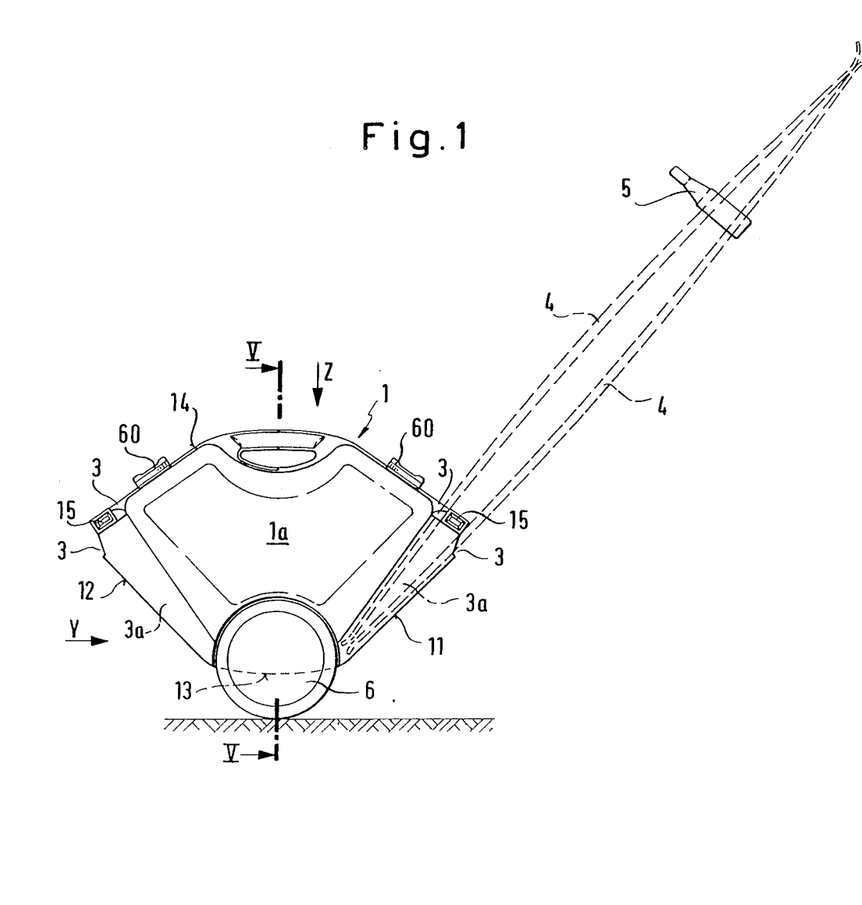
FIG. 1 is a diagrammatic view of the embodiment of the transport device, the transporting of ski equipment being shown as example.

As can be noted from FIGS. 1 to 5, the transport device has a transport container (1) which is formed by two identical half-shells (1a, 1b), so that the transport container is divided along its central plane, i.e. in the plane of the drawing of FIG. 1, this longitudinal central plane corresponding to its direction of movement. The two half-shells can be fastened to each other by means of locking parts, as will be explained in further detail below.

The transport container (1) has two bottom surfaces (11, 12) which are inclined to each other at an angle of or equal to less than 90° and are attached to each other via a rounded lower connecting surface (13).

Figure 2:
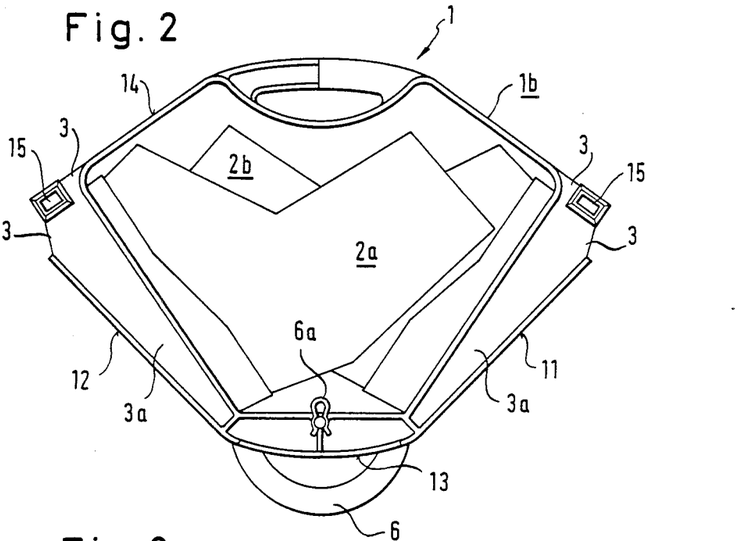
FIG. 2 is a longitudinal section through the transport container along the line II—II of FIG. 4.
Figure 5:
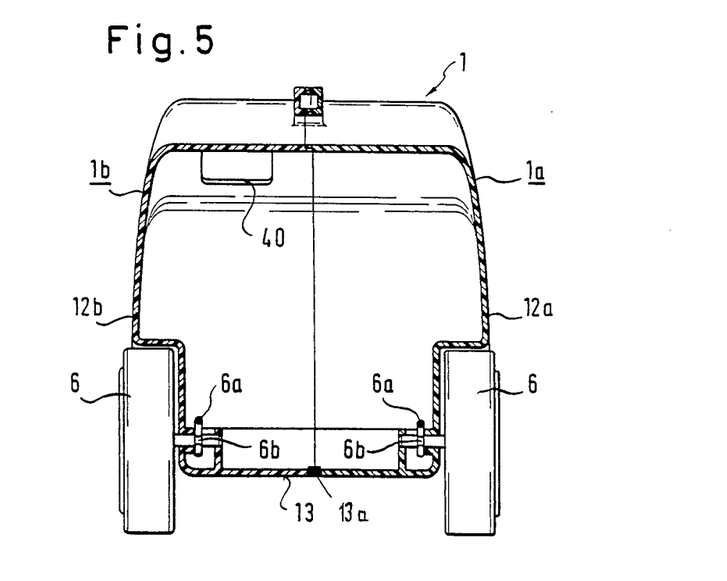
FIG. 5 is a cross-sectional view of the transport container along the line V—V of FIG. 1.

The bottom side of the transport container (1) which is formed by the bottom surfaces (11, 12) and the connecting surface (13) forms a slide skid which permits of easy sliding of the transport container on snow, soft sand or the like. Furthermore, there are provided on the transport container two laterally arranged wheels which, in accordance with FIGS. 2 and 5, are fastened via detent devices (6a) in detachable manner to the transport container (1). These detent devices can be formed by spring yokes which engage in annular grooves in axles (6b) of the wheels (6), which are inserted from the side surfaces (12a, 12b) of the transport container into holes in said side surfaces. The wheels prevent lateral slipping of the transport container on soft soil in hilly terrain since they sink in such case into said soil and the bottom of the transport container acts as slide surface. The wheels can be stored in receiving devices within the transport container so that the transport container can be transported in the manner of an ordinary suitcase.

As can be noted in particular from FIG. 2, adjoining the bottom walls (11, 12) of the transport container there are developed holding channels (3a) into which skis (4) (FIG. 1) or other elongated articles of athletic equipment can be inserted. As can be noted from FIGS. 2 and 3, these holding channels (3a) lead into insertion openings (3) in the region of the cover surface (14) of the transport continer.

This insertion opening is traversed by a spreading device (15) which extends perpendicular to the longitudinal central plane of the transport container (1) and serves to separate from each other two articles of athletic equipment, such as for instance skis (4) which have been inserted into the holding channel (3a), and spread them apart, this spreading apart being further supported by the conically downward tapering shape of the holding channel (3a). This spreading movement of the skis (4) is, however, counteracted by a holding grip (5) which holds the two skis together and, in final result, causes a swinging around the spreading device (15) of the two skis which lie against each other. In this way, the ends of the skis present in the holding channel (3a) are spread apart so that they rest firmly against the upper and lower limiting walls of the holding channel (3a) and a firm holding of the skis in the holding channel (3a) results. The accurate holding of the skis in the holding channel and against the spreading device (15) can be improved in the manner that the spreading devices (15) are tapered in the direction towards their central part (15a), as can be noted from FIG. 3, so that the skis are centered along the central part. In this way, there is obtained a very accurate holding and guiding of the skis or other articles of athletic equipment in the holding channel and the skis or other elongated articles of athletic equipment can then take over the task of a pull or push rod for moving the transport container on the ground.

Upon use for the transportation of ski equipment, the two ski boots (2a, 2b) are arranged in a accordance with FIG. 1 alongside of each other in the transport container (1) so that a relatively low center of gravity results and it is possible to place the transport container with vertically standing skis on one of the bottom surfaces (11, 12) which extend at an angle to each other.

Figure 3:
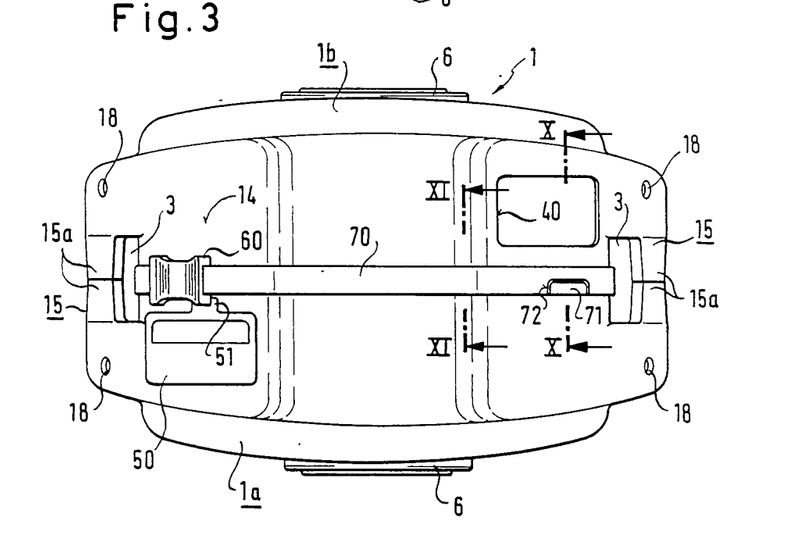
FIG. 3 is a top view of the transport container along the line Z of FIG. 1.
Figure 4:
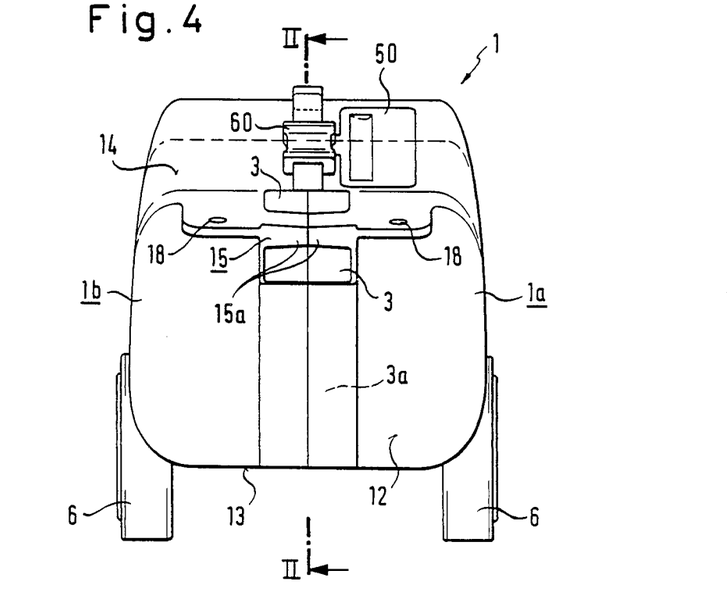
FIG. 4 is a rear view of the transport container along the line V of FIG. 1.

The holding grip (5) can furthermore be used for the holding of the upper end of ski poles (not shown) the tips of which are inserted into the openings (18) of the cover surface (14), as shown in FIG. 3.

The holding grip (5) can be put on any desired place of the skis (4) or other articles of athletic equipment such as, for instance, fishing rods, javelins or the like, whereby adaptation to the height of the user can be achieved.

Figure 6:
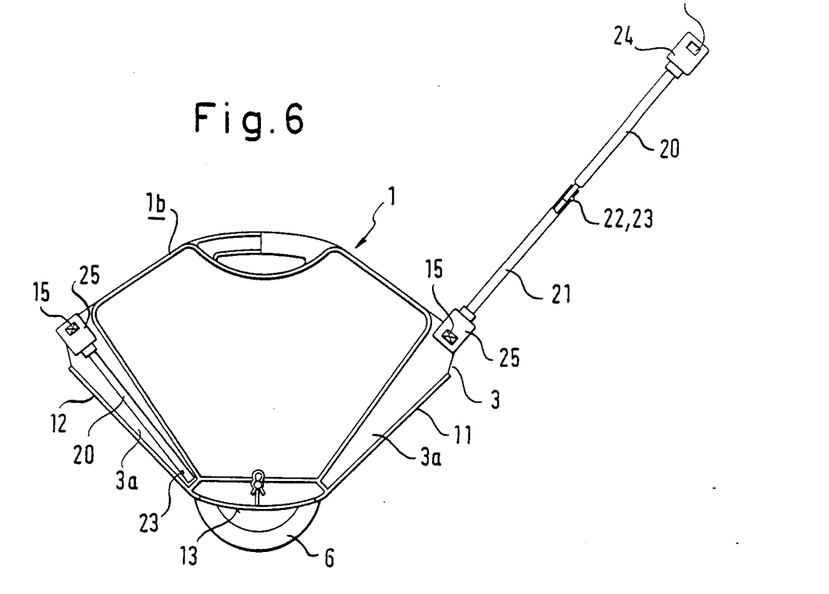
FIG. 6 is a view corresponding to FIG. 2 which shows in the left-hand half an inserted push-rod section and in the right-hand half the two assembled push-rod sections placed on the spreading device.

If the athletic equipment to be transported does not include such elongnated articles of athletic equipment one can, in accordance with another embodiment of the transport device, provide a divided pull rod which is formed by pullrod sections (20, 21) which when not in use can be stowed in the manner shown in the left-hand half of FIG. 6 within the transport container (1) in the holding channels (3a). The sections of pull rod (20, 21) are shown in detail in FIGS. 7a and 7b and it can be noted that they are provided at their one end with detent devices (22, 23) which permit telescopic interinsertion and interconnection of the two sections of pull rod (20, 21). At the ends opposite the detent devices (22, 23), the pull rod sections (20, 21) have in each case grips (24, 25) which have non-circular holes passing through them (26), as can be noted in particular at the free end of the pull rod in FIG. 6. Into these non-circular holes there can be pushed the sections of the spreading devices (15) which are formed on the corresponding half-shells (1a, 1b) of the transport container, as can be noted from FIG. 6, so that the pull rod formed from the pull rod sections (20, 21) is rigidly fastened to the transport container (1).

Upon non-use, the two push rod sections (20, 21) are separated from each other and, with the transport container (1) open, inserted in the holding channels in the manner shown in the left-hand half of FIG. 6 in such a way that the non-circular holes (26) of the hand grips (24, 25) are pushed over the spreading devices (15) so as to obtain a dependable holding of the push rod sections (20, 21) in the holding channels (3a) when the transport container is closed.

Figure 7A:
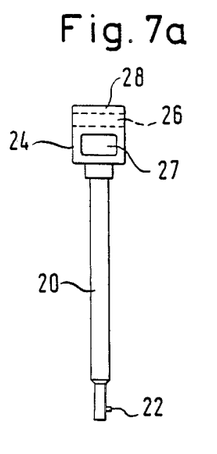
FIGS. 7a, 7b are a view of the two pull-rod sections which can be inserted one into the other.
Figure 7B:
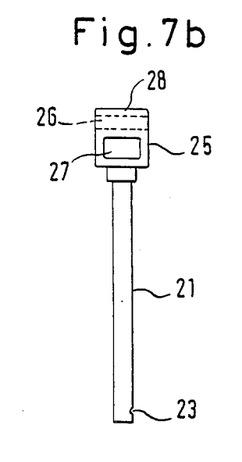

For the development of the detent devices (22, 23) many possibilities are known in the man skilled in the art, one possibility consisting in developing these telescopic detent devices in the manner customary in the case of vacuum cleaner tubes, as shown in FIGS. 7a and 7b.

In order to facilitate the grasping of the pull rod the grips (24, 25) are furthermore provided with a recess (27) which extends perpendicular to the non-circular opening (26) so that the grips form a bar (28) which can easily be grasped by hand.

Figure 8:
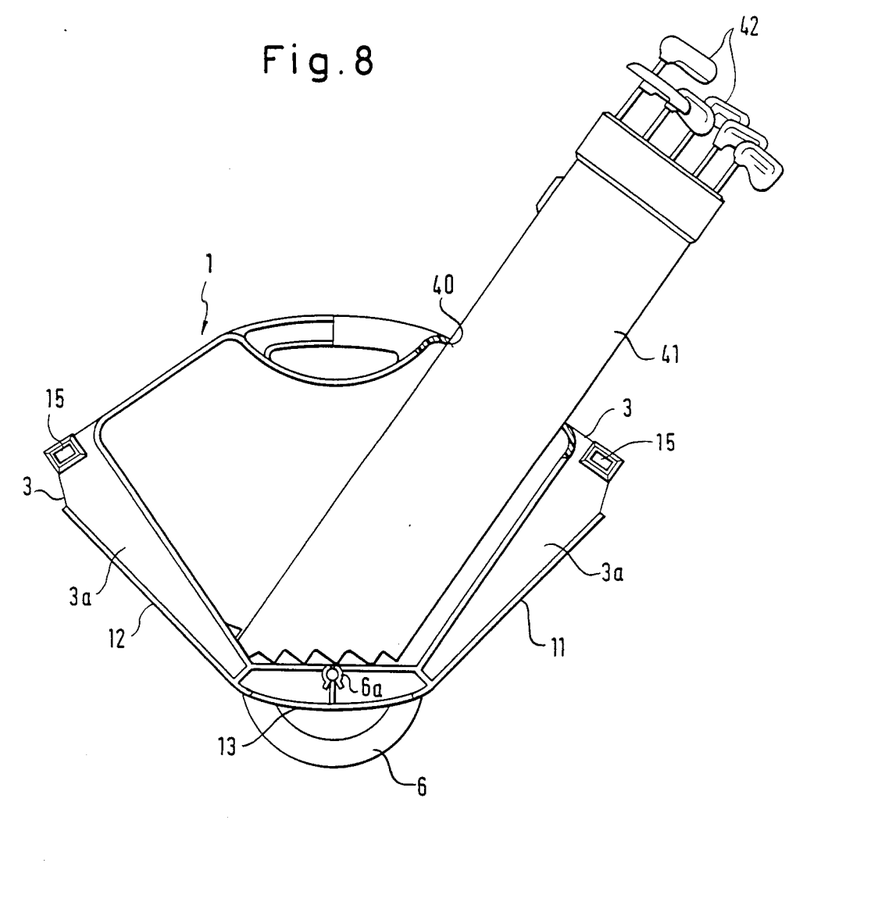
Figure 9:
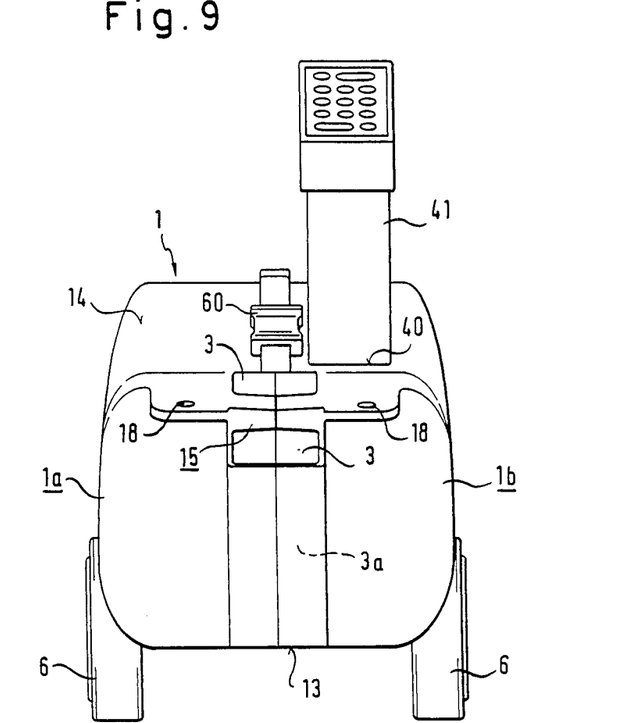
FIG. 9 is a view corresponding to FIG. 4 of the transport container with golf bag inserted.

If given athletic equipment comprises a large number of elongated articles of equipment for all of which there is not room in the holding channels (3a) of the transport container (1), then these articles of equipment can be arranged in special holding devices, as shown for the example of golf clubs in FIGS. 8 and 9.

As can be noted in particular from FIG. 3, there are provided in the cover surface (14) of the transport container openings (40) which debouch into the inside of said transport container and which can be closed by flaps (50). After the removal of a flap, holding devices (41) can be inserted into said openings, for instance a golf bag to receive the golf clubs (42). This bag, at its upper end, a cap in which openings of different size are developed, into which openings the individual golf clubs (42) can be inserted. Due to the fact that the lower end of this bag (41) is beveled adjacent the connecting surface (13), there result within this bag insertion channels of different length which permit of adaption to the different lengths of the golf clubs (42).

Small containers or flat trays for the receiving of small parts such as, for instance, keys, purses and the like can be inserted into these openings (40), which can then also be closed by the flaps (50).

As can be noted from the left-hand half of FIG. 3, these flaps (50) can be simultaneously closed by closure slides (60) which serve to close the transport container (1) and can act via extensions (51) on the flaps (50). In the embodiment shown in FIG. 3 it is assumed that the two half-shells (1a, 1b) of the transport container (1) are connected by hinge means in the region of the connecting surface (13). In another embodiment, however, such hinge means 13a can also be provided in the region of the bottom walls (11, 12).

Figure 10:
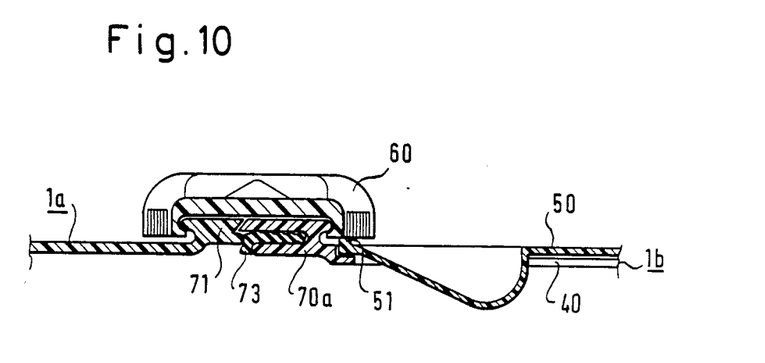
FIG. 10 is a partial section along line X—X of FIG. 3.
Figure 11:
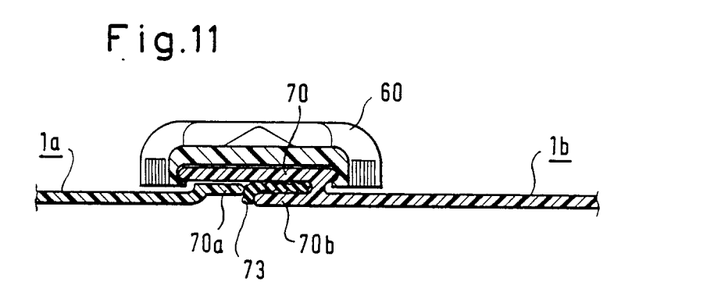
FIG. 11 is a partial section along line XI—XI in FIG. 3.

As can be noted from a comparison of FIG. 3 and the sectional views of FIGS. 10 and 11, the edges of the two half-shells (1a, 1b) are provided in the region of the cover surface (14) with a bead of substantially dovetail-shaped cross section on which the recess of complimentary shape of the closure slides 60 slide. As can be noted from the sectional view of FIG. 11, this bead (70) is provided only on the right hand portion of the half shell (1b) as seen in FIG. 3, and it grips over an edge region (70a) of the other half shell (1a). Since the transport container (1), due to the identity of the two half-shells, is developed with mirror symmetry around a vertical plane extending through the wheel axles 66, opposite conditions are obtained in the region of the closure slide (60) shown in FIG. 3 in the left-hand half of this figure, i.e. the half-shell (1a) has an overgripping bend (70) in the edge region (70a) of the half-shell (1b).

As can furthermore be noted from the right-hand half of FIG. 3, in which neither the cover nor the closure slide are shown in order that other details may be evident, the bead (70) is provided in this region with a recess (72) into which there engages a projection (71) of the edge region, as shown in FIG. 10. When the closure slide is arranged above this projection (71), it connects the two half-shells firmly to each other. In the position of the closure slide (60) shown in the left-hand half of FIG. 3, this closure slide (60) lies both over the projection (71), not visible at this place, so that the two half shells (1a, 1b) are locked to each other and at the same time a wider end region of the closure slide (60) lies over the extension (51) of the cover (50) so that the latter is also held fast in its position. When the slide is pushed further to the right from the position shown in the left-hand half of FIG. 3, the narrower central region of the closure slide comes first of all over the extension (51) of the cover so that this cover can be opened. If the closure slide (60) is pushed still further to the right in the left-hand half of FIG. 3 then the left wider end region of the closure slide comes again over the extension (51) so that the cover is kept closed while on the other side the closure slide (60) no longer covers the projection (71) so that the two half-shells (1a, 1b) can be opened.

As can be noted furthermore from FIGS. 10 and 11, the corresponding half-shell which bears the bead (70) has a recess which is formed by the bead (70) and its inner edge (70b), in which recess there is a seal (73) which provides an improved sealing of the two half-shells. Such a seal can also be arranged circumferentially between all edge regions of the two half-shells.

I claim:

1. A transport device for athletic equipment, the transport device comprising:
    a transport container which is movable over the ground and receives a part of the athletic equipment;
    means for securing to the transport container a push or pull rod and wheels;
    the transport container (1) including two bottom surfaces (11, 12) which are inclined to each other at an angle of less than or equal to 90°, said surfaces extending transversely to a vertical longitudinal central plane which lies in the direction of movement and being connected to each other at their lower end by a rounded connecting surface (13);
    the transport container being divided along its longitudinal central plane into two substantially identical half shells (1a, 1b) which can be connected to each other by locking means (60), each of the half shells comprising a side wall and corresponding partial sections of the bottom surfaces (11, 12), of the connecting surface (13), and of a cover surface (14) which forms the top of the transport container;
    holding channels (3a) to receive one end of elongated articles of athletic equipment (40), the channels extending substantially parallel to a corresponding bottom wall in the transport container (1); and
    the holding channels (3a) leading, at their upper end, into insertion openings (3) which are formed in the region of the cover surface (14) of the transport container (1).

2. A transport device according to claim 1, characterized by the fact that the bottom side of the transport container (1) which is formed by the connecting surface (13) and the bottom surfaces (11, 12) forms a slide skid.

3. A transport device according to claim 1 characterized by the fact that a wheel (6) is detachably fastened by detent means (6a) to each half shell (1a, 1b).

4. A transport device according to claim 1, characterized by the fact that the two half-shells (1a, 1b) are pivotally connected to each other along an edge surface so that the two half-shells are swingable.

5. A transport device according to claim 1, characterized by the fact that at least one of the holding channels (3a) extends from the insertion opening (3) in the direction towards its lower end in the longitudinal central plane, in a slightly conically tapering shape; that, at the upper end of the holding channel (3a) above the insertion opening there is an elongated barshaped spreading device (15) extending transverse to the longitudinal central plane for the spreading apart of elongated articles of athelethic equipment (4) inserted into the holding channel (3a); the spreading device having opposed longitudinal edges whereby pairs of articles of athletic equipment can be inserted past the opposed longitudinal edges of the spreading device (15) into the holding channel (3a).

6. A transport device according to claim 5, characterized by the fact that a holding handle (5) is provided which can be fastened on the part of the elongated articles of athletic equipment (4) extending out of the transport container (1) at a place adapted to the height of the user and holds the articles of athletic equipment together at their free end against the action of the spreading device (15), so that said articles of athletic equipment after insertion into the transport container (1) form the pull or push rod for the transport container.

7. A transport device according to claim 5, characterized by the fact that each spreading device (15) tapers down towards its central part (15a).

8. A transport device according to claim 1, including a spreading device (15) and a push or pull rod having two substantially identical pull rod sections (20, 21), wherein one respective end of each said pull rod section bears detent means (22, 23) for the telescopic connecting of the two pull rod sections (20, 21) to form a single pull rod, and another respective end of each said rod section bears a grip (25) which has a non-circular hole (26) which extends through it and the shape and dimensions of which are adapted to the cross-sectional shape of the spreading device (15), so that one of the grips (25) can be pushed over the spreading device (15).

9. A transport device according to claim 8, characterized by the fact that the pull rod sections (20, 21) have a length corresponding to the length of the holding channels and can be placed over the spreading device (15).

10. A transport device according to claim 1, characterized by the fact that the half-shells (1a, 1b) of the transport container (1) have openings (40) in the cover surface (14) which lead into the inside of the transport container and into which replaceable holding devices (41) to receive separately arrangeable articles.

11. A transport device according to claim 10, characterized by the fact that the openings (40) can be closed by flags (50).

12. A transport device according to claim 10, characterized by the fact that at least one of the holding devices is formed by a bag (41) for golf clubs (42) or the like.

* * * * *